(12) United States Patent
Bean

(10) Patent No.: US 6,572,129 B1
(45) Date of Patent: Jun. 3, 2003

(54) DUAL POWER RECUMBENT TRICYCLE

(76) Inventor: Gregory Bean, 1682 Boulder Creek Rd., Oceanside, CA (US) 92056

( * ) Notice: Subject to any disclaimer, the term of this patent is extended or adjusted under 35 U.S.C. 154(b) by 0 days.

(21) Appl. No.: 09/624,509

(22) Filed: Jul. 24, 2000

(51) Int. Cl.⁷ .............................................. B62M 1/00
(52) U.S. Cl. ..................... 280/234; 280/230; 280/233; 280/242.1; 74/137
(58) Field of Search ................................. 280/233, 282, 280/230, 234, 240, 240.1, 244, 247, 248, 288.1; 74/137

(56) References Cited

U.S. PATENT DOCUMENTS

| | | | |
|---|---|---|---|
| 3,760,905 A | * 9/1973 | Dower | 185/2 |
| 3,913,929 A | * 10/1975 | Matsuura | 280/7.14 |
| 4,373,740 A | * 2/1983 | Hendrix | 280/269 |
| 4,410,198 A | * 10/1983 | Fernandes et al. | 280/281 |
| 4,456,277 A | * 6/1984 | Carpenter | 280/282 |
| 4,469,343 A | * 9/1984 | Weatherford | 280/261 |
| 4,541,647 A | * 9/1985 | Braun | 280/234 |
| 4,632,414 A | * 12/1986 | Ellefson | 280/246 |
| 4,705,284 A | * 11/1987 | Stout | 280/242 |
| 5,209,506 A | * 5/1993 | Klopfenstein | 280/240 |
| 5,263,732 A | * 11/1993 | Harmeyer | 280/288.1 |
| 5,272,928 A | * 12/1993 | Young | 74/137 |
| 5,280,936 A | 1/1994 | Schmidlin | 280/234 |
| 5,328,195 A | * 7/1994 | Sommer et al. | 280/233 |
| 5,383,675 A | * 1/1995 | Liebert | 280/266 |
| 5,536,029 A | * 7/1996 | Gramckow | 280/263 |
| 5,568,935 A | * 10/1996 | Mason | 280/282 |
| 5,653,663 A | * 8/1997 | McCahon | 482/62 |
| 5,690,346 A | * 11/1997 | Keskitalo | 280/234 |
| 5,826,897 A | * 10/1998 | Beard | 280/250.1 |
| 5,901,973 A | * 5/1999 | Warren | 280/260 |
| 6,173,981 B1 | * 1/2001 | Coleman | 280/253 |

FOREIGN PATENT DOCUMENTS

DE 29802643 U1 * 6/1998

* cited by examiner

Primary Examiner—Lesley D. Morris
Assistant Examiner—Daniel Yeagley
(74) Attorney, Agent, or Firm—Donn K. Harms

(57) ABSTRACT

A recumbent tricycle which includes a propulsion system which includes a combination of foot and arm power for propulsion. Pedals are operated with the rider's legs. Handles are also connected to the drive mechanism, with the handles pulled back and pushed forward to add to propulsive power. The handles are also connected through a tie rod arrangement to the front wheels such that the wheels may be turned so that the vehicle can be steered by moving the handles toward one side or the other. Preferably, two large front wheels similar to conventional bicycle wheels are provided in front, with a single smaller diameter but wider driven rear wheel. The rear wheel is mounted on a sub-frame pivotally secured to the vehicle frame and supported on a shock absorber. Brake and gear change mechanism controllers are mounted on the handles.

11 Claims, 4 Drawing Sheets

DUAL POWER RECUMBENT TRICYCLE

FIELD OF THE INVENTION

This invention relates in general to three wheel tricycles powered both by leg powered peddles and arm powered movable handlebars.

BACKGROUND OF THE INVENTION

A wide variety of propulsion systems have been developed for bicycles, tricycles, etc. Commonly, such cycles have a rotating sprocket connected to pedals that revolve around the sprocket axis, with the sprocket carrying a chain driving a sprocket connected to the rear wheel. The front wheel is mounted on a stem and is turned by a pair of outwardly extending handlebars. Whether the rider is positioned in an upright or recumbent position, the cycle is relatively easy to steer and propel. The arms are used solely for steering and are not involved in propelling the cycle.

A number of different drive systems have been devised to gain additional propelling energy from the arms. Typical of these are the "rowing" type systems described by Young in U.S. Pat. No. 5,272,928, McCahon in U.S. Pat. No. 5,653,663 and Keskitalo in U.S. Pat. No. 5,690,346. Each of these recumbent cycles uses a "rowing" motion in which handles and pedals are alternately pushed back in forth in a generally straight line. Handles or a handle assembly must be rotated or pivoted while being moved back and forth. With these complex mechanisms and straight line motion, maintaining balance and smoothly steering while providing maximum power is quite difficult.

Braun in U.S. Pat. No. 4,541,647 combines pedals on a sprocket for rotation by the legs and two closely spaced handles alternately pushed and pulled forward and back. One handle is pushed forward while the other is pulled back, creating unbalanced forces which will make steering the cycle by tilting the handle assembly very difficult.

Sommer et al. in U.S. Pat. No. 5,328,195 describe a basically conventional bicycle having a pedal sprocket connected to a drive sprocket at the rear wheel with handlebars that can be lifted and lowered as a unit. The handlebar motion pulls a cable wrapped around a pulley secured to the drive sprocket to provide added rotational force during the lifting phase of handlebar movement. Lifting handlebars generate considerably less force that will a pulling motion back toward the rider and a cable and pulley arrangement is much less positive than a chain and sprocket.

Thus, there is a continuing need for a cycle, particularly for off-road riding, that is simple is structure and avoids unreliable complexity, is low to the ground for increased stability and lower wind resistance, provides for increase power generation by both a rider's arms and legs and avoids unbalanced forces on the steering mechanism to provide easy and accurate steering while providing maximum arm propulsive forces.

SUMMARY OF THE INVENTION

The above-noted problems, and others, are overcome by the dual power tricycle of this invention, which basically comprises a frame, a rider's seat mounted on the frame, three wheels mounted on the frame, with two wheels forward and one aft of the seat or, alternatively, one forward and two aft of the seat, a foot power assembly connected between foot pedals operable by a rider's feet and at least one of the wheels for rotating the wheels in response to foot pedal rotation, two hand levers operable by a rider's hands for moving forward and aft, a hand power assembly connected between said hand levers and at least one of the wheels for further rotating said wheels in response to forward and aft movement of said hand levers, steering means for steering forward wheel(s) in response to sideways movement of said hand levers and brake operating means mounted on said hand levers and connected to wheel rotation braking means at least some of said wheels.

While the frame may be constructed of any suitable material and components, a welded tubular metal frame and/or a tubular fiber reinforced resin frame is preferred. Any suitable seat may be used. Preferably, since the rider sits in a semi-recumbent position with his or her legs extending forward, the seat has a back.

The foot poser assembly comprised a pair of conventional foot pedals forward of the seat, directly driving a first sprocket connected via a chain and conventional gearbox(es) to the rear wheel(s). Preferably, a first conventional gear changing mechanism is provided adjacent to the pedals with a gear changing lever for the first gear changer on one hand lever. A second conventional gear box is positioned generally below the seat, with a second gear changing lever for the rear gear box mounted on the second hand lever. Regular bicycle chains run from the first gear box to the second gear box and then to the wheel. Idler gears are provided as desired to direct the chain between these components and to adjust chain tension.

The hand power assembly comprises the two hand levers mounted so as to pivot forward and aft about a pivot point at the lower ends of the levers. A standard bicycle chain is secured to a crosspiece connecting the two hand levers, wraps around a ratchet sprocket attached coaxially with the first sprocket and pedals, then to a stiff spring fastened to the frame. When the handles are not moved forward and aft (or are moved slowly) the ratchet sprocket free wheels. When the handles are moved sufficiently rapidly to cause the rim speed of the ratchet sprocket to exceed the rim of the first sprocket, the ratchet will lock and the force rotating the ratchet sprocket is transmitted to the drive chain assembly, increasing vehicle speed. Generally, the ratchet sprocket will have a considerably smaller diameter than the first sprocket, since the foot pedaling speed is likely to be greater than the hand lever motion.

The lower ends of the hand levers are mounted on the crosspiece so as to be pivotable to either side. A bracket on the crosspiece pivots sideways with the hand levers. A cable connected to sides of the bracket is connected to a tie rod adjacent to the front wheel(s) axis, so that sideways pivoting of the hand levers will cause rotation of the front wheel(s) about a generally vertical axis, steering the vehicle.

Each of the three wheels is preferably mounted on a shock absorbing assembly, to reduce bumps and vibration when the vehicle is ridden along a rough surface.

Conventional caliper brakes are mounted to engage the front wheel(s) via conventional handlebar mounted levers and cables. A disk brake is mounted along a side of the rear wheel(s) and is actuated by levers.

BRIEF DESCRIPTION OF THE DRAWING

Details of the invention, and of preferred embodiments thereof, will be further understood upon reference to the drawing, wherein.

DETAILED DESCRIPTION OF PREFERRED EMBODIMENTS

Figure 1:
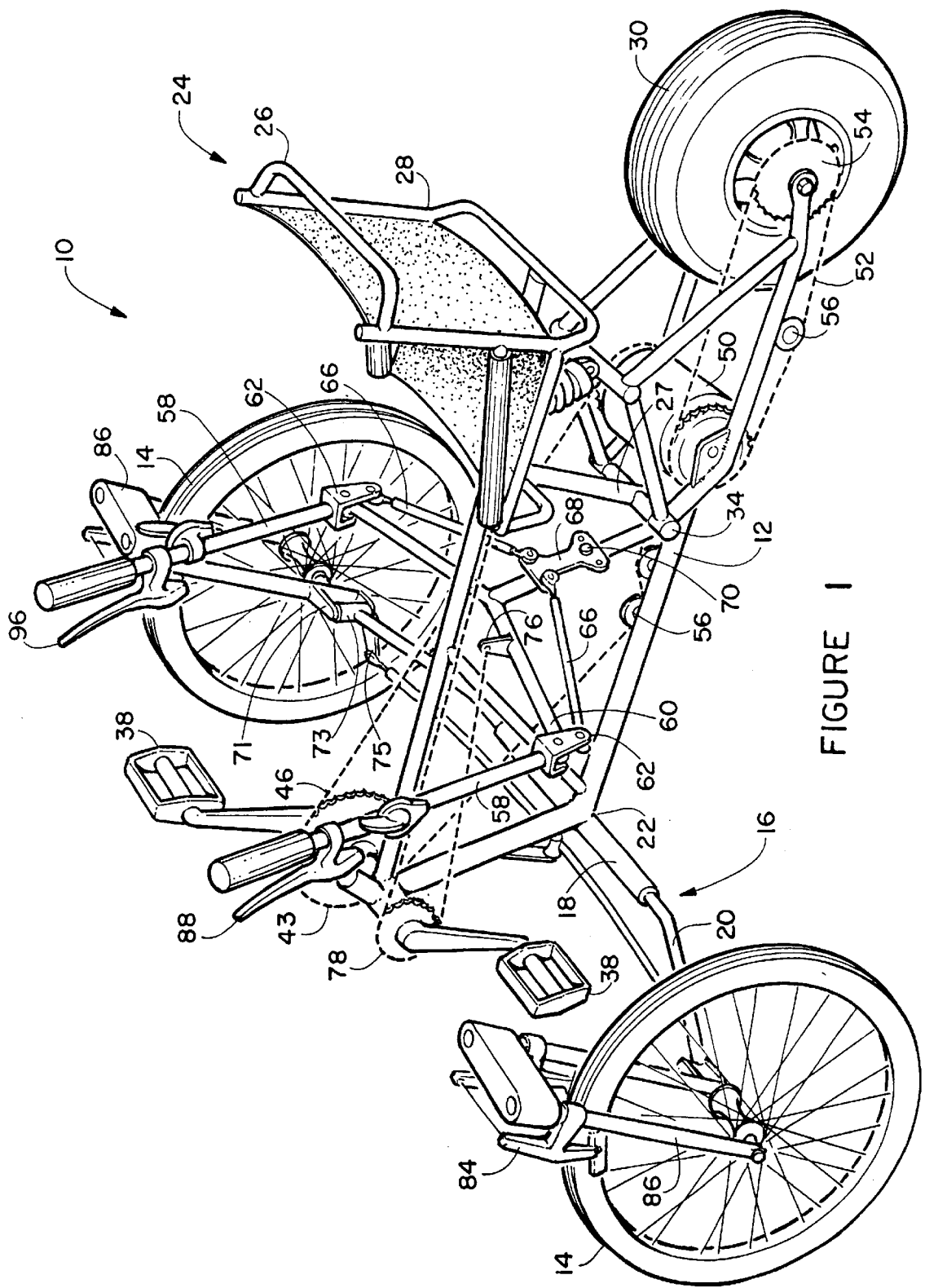
FIG. 1 is a perspective view of the recumbent tricycle of this invention.

Referring to FIG. 1, there is seen an over all perspective view of the recumbent, dual-power, tricycle 10 of this invention. Portions of the various control cables and drive chains are cut away and not all components are shown in each Figure for clarity of illustration.

The tricycle 10 is based on a frame 12 formed from tubing that is cut to size and welded together. While light weight, high strength, metal tubing is preferred, if desired fiber reinforced composite tubing may be used, if desired.

Figure 2:
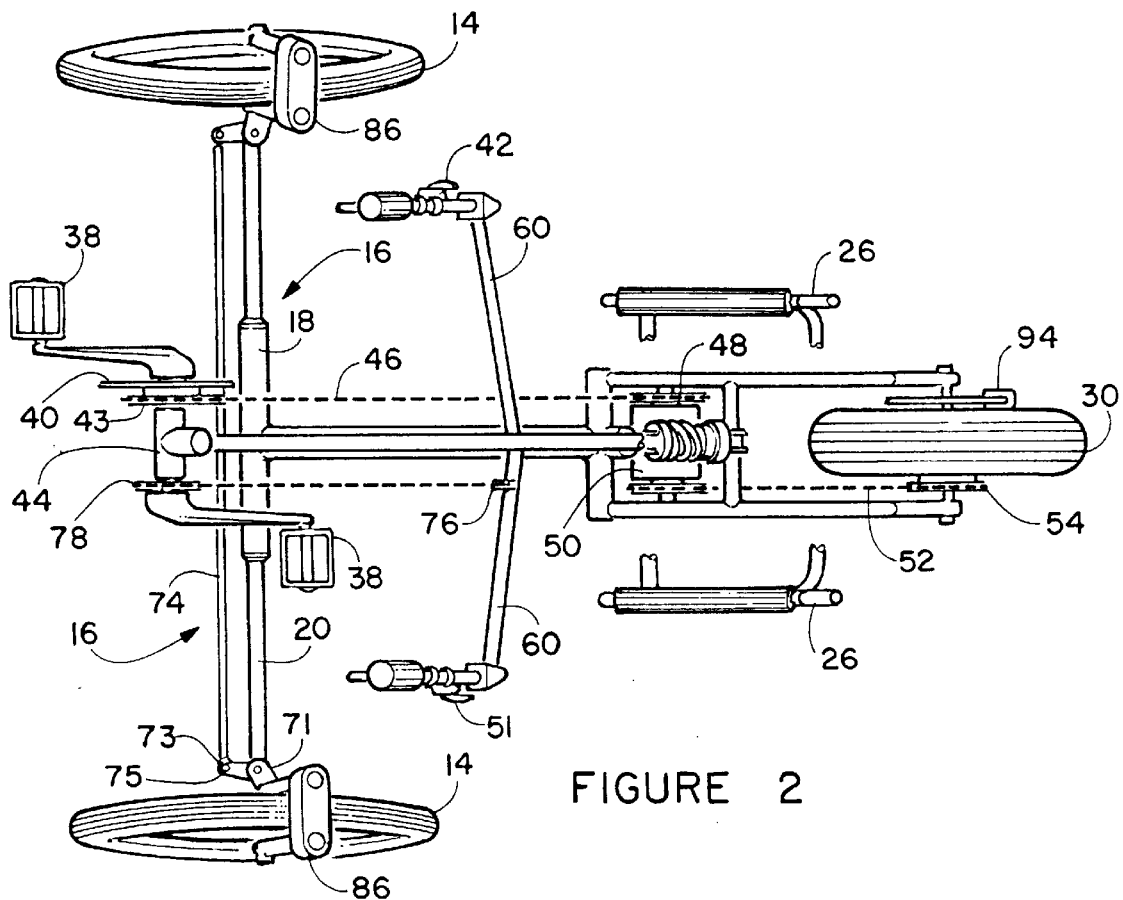
FIG. 2 is a plan view of the recumbent tricycle.
Figure 4:
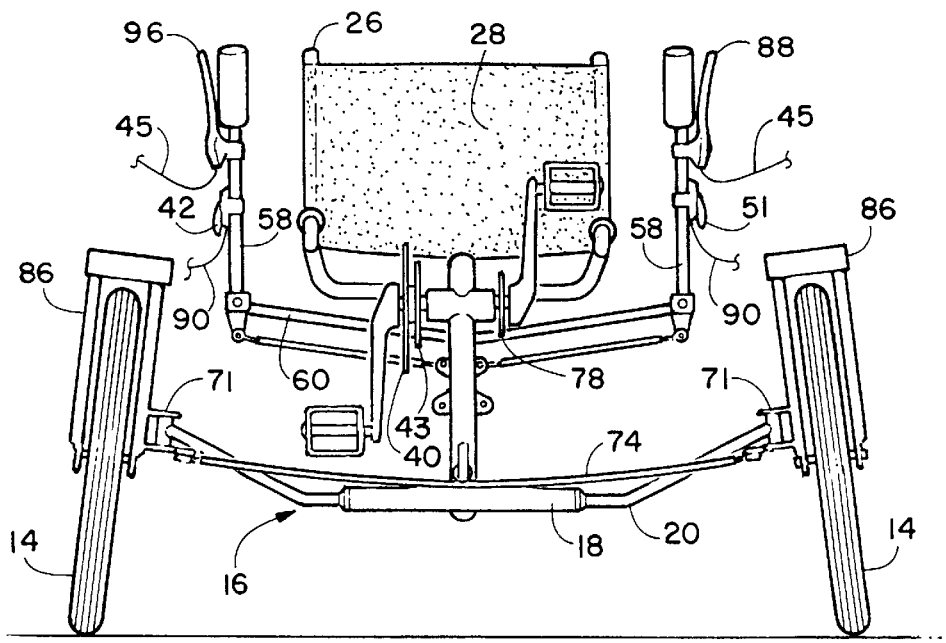
FIG. 4 is a front elevation view of the recumbent; tricycle.

Two forward wheels 14 are mounted for rotation of an axle 16, as best seen in FIGS. 1, 2 and 4. While any suitable straight or bent axle may be used, the bent form shown provides optimum clearance for the tie rod assembly, described below. Preferably, axle 16 has a central tubular portion 18 into which thinner end portions 20 are inserted and secured, such as by setscrews (not seen). This permits the vehicle tread to be adjusted and to have the wheels 14 to be removed for transportation or storage. Center portion 18 is secured, such as by welding, to frame 12 at point 22.

A conventional seat 24, consisting of a metal seat frame 26 and a covering 28 of canvas or the like. Seat frame 26 is secured to seat post 27, which is part of frame 12, by welding, bolts, etc.

A rear wheel 30 is mounted on a sub-frame 32 which is pivotally mounted to frame 12 at a pivot point 34. A small, conventional, shock absorber 36 (as best seen in FIG. 3) is secured between frame 12 and sub-frame 32 to absorb shocks as rear wheel 30 traverses bumps and limits transfer of shock to seat 24.

For optimum performance, front wheels 14 are relatively large diameter wheels as conventionally used with bicycles. Rear wheel 30, which drives the tricycle as detailed below, preferably has a relatively small diameter, preferably from about one-half to two-thirds the diameter of front wheels 14 and is relatively wide, to provide outstanding adhesion to the ground.

Figure 3:
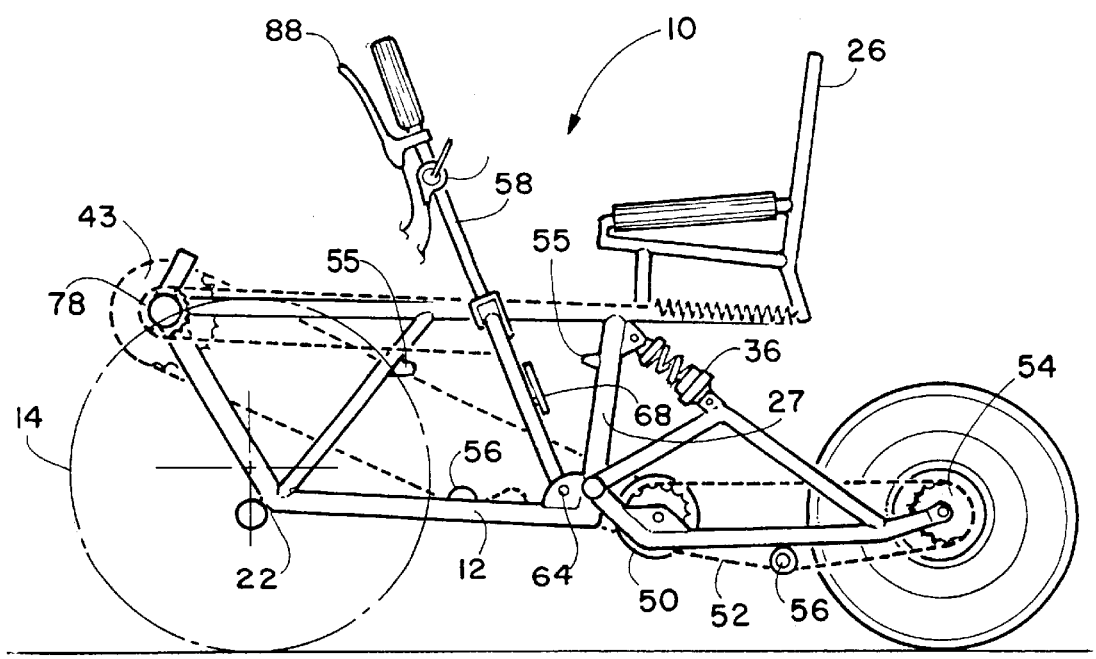
FIG. 3 is a side detail view recumbent tricycle showing the hand power mechanism.

As best seen in FIGS. 1–3, a conventional bicycle-type arrangement of pedals 38, main sprocket 40 and second sprocket 43 on a hub 44 secured to frame 12 is provided. Second sprocket 43 is operated in a conventional manner by a controller 42 on the left handle 58 via a conventional cable 45. A conventional drive chain 46 (schematically shown in dashed line form) extends from main sprocket 40 to a small sprocket 48 (as seen in FIG. 2) on a conventional second gear change mechanism 50. A conventional gear change lever 51 is mounted on the right handle 58 and operates gear changer 50 via a cable 53 (FIGS. 1 and 4). A second drive chain 52 extends from second gear changer 50 to a sprocket 54 on rear wheel 30. A conventional chain tightener 56 is preferably included along chain 46 between sprocket 40 and gear changer 50. A conventional spring-loaded idler wheel 56 is preferably included along chain 52 to accommodate bounce of rear wheel 30.

Figure 5:
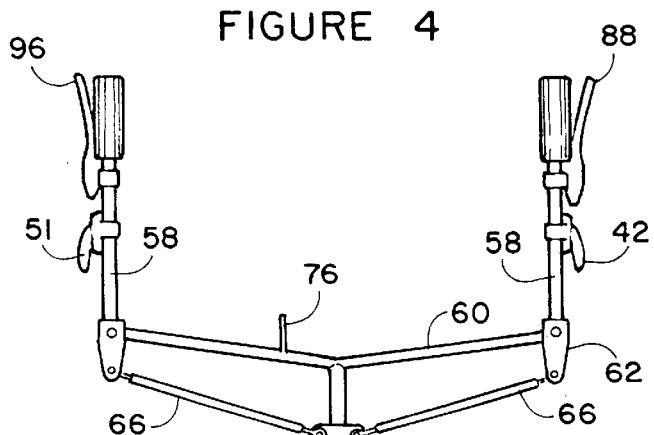
FIG. 5 is a detail of the steering system.
Figure 8:
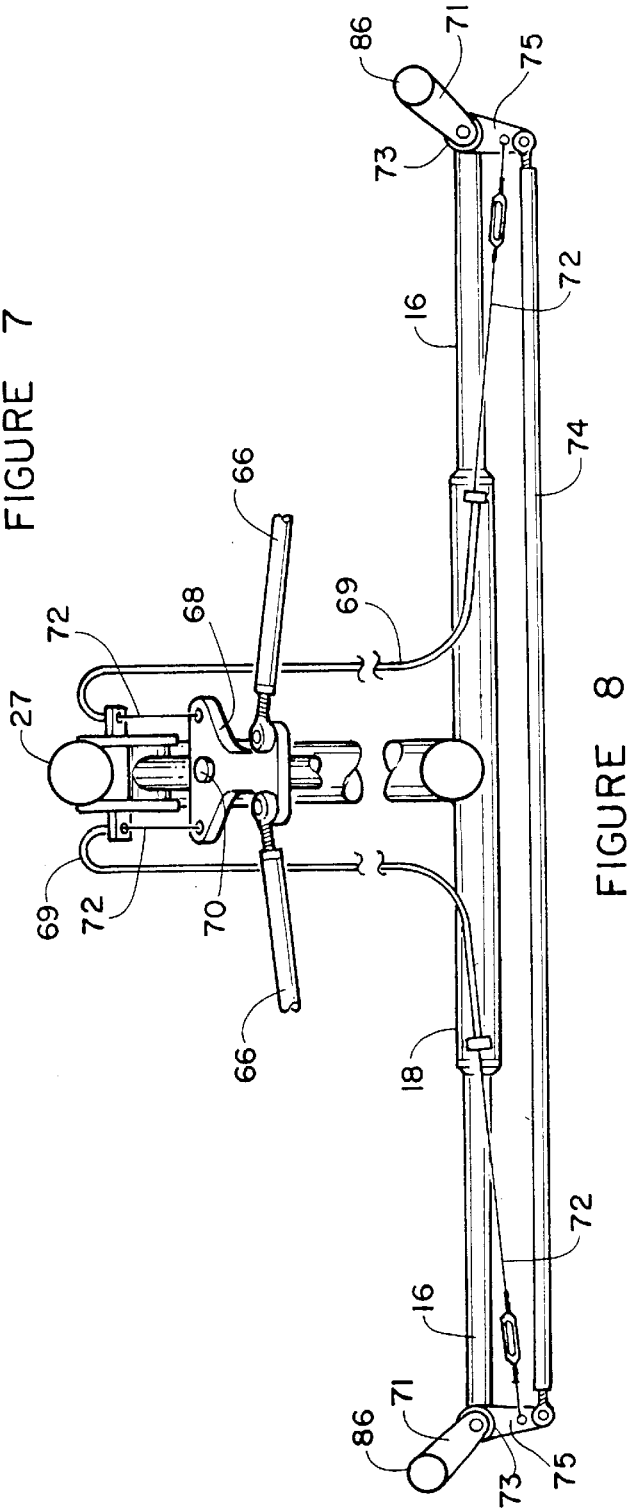
FIG. 8 is a detail plan view showing steering assembly.

As best seen in FIGS. 1–4, the rider applies additional propulsive force through a pair of hand levers 58 that are pulled toward the rider and pushed away. Each lever 58 is pivotally mounted on a yoke 60 by a bracket 62 which allows the levers to move from side to side. Yoke 60 is pivotally mounted on frame 12 by a bracket 64 (as best seen in FIGS. 3 and 5). Two connecting rods 66 (as best seen in FIGS. 5 and 8) are fastened at one end to the lower end of brackets 62 and at the other to a pivot member 68. Moving levers 58 to the side will cause pivot member 68 to turn about pivot point 70. Ends of axle 16 are secured to pins 73 rotatably mounted in forks 71. Cables 72 extend from pivot member 68 to arms 75 rigidly secured to forks 71 to cause rotation of wheels 14 about an approximately vertical axis as tie rod 74 is moved, as seen in FIG. 8.

Figure 7:
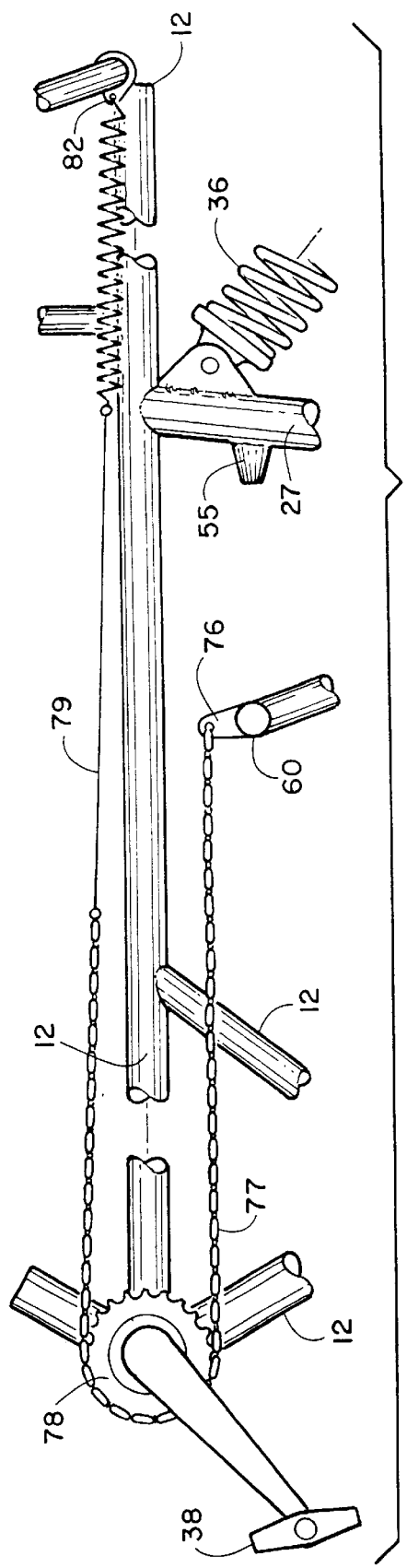
FIG. 7 is a detail elevation view showing the handle drive arrangement.

As mentioned above, the entire assembly of handles 58 and yoke 60 pivots forward and back about a pivot in bracket 64. Rubber bumpers 55 (FIGS. 3 and 7) are provided to protect the frame 12 and handles 58 should the handles be moved too far in either direction. A conventional chain 77 extends from a bracket 76 (FIGS. 1 and 2), around a small ratchet-type sprocket 78 and back to an extension spring 80 and frame connector 82 as seen in FIG. 7. Preferably, a steel cable 79 is inserted between chain 77 and spring 80. When the handles are moved in the power stroke, with the rider pulling the handles back the ratchet will engage and the pulling power will be added to the pedaling power, increasing drive power and speed. When the handles are pushed back forward, the ratchet will release and slip.

Figure 6:
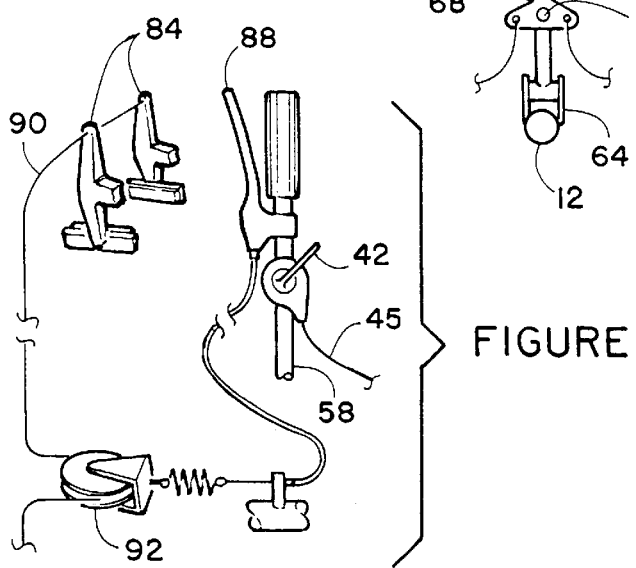
FIG. 6 is a detail perspective view of the front brake system.

Conventional caliper brakes 84 are supported by mounts 86 at each front wheel. A conventional lever-type brake controller 88 operates the front brakes though a cable 90 and idler 92, as seen in FIG. 6. A disk brake 94 (FIG. 2) is provided on rear wheel 30, operated by lever type controller 96 (FIG. 1) via a conventional cable, not shown for clarity.

Other variations, applications and ramifications of the present invention will occur to those skilled in the art upon reading this disclosure. Those are intended to be included within the scope of this invention, as defined in the appended claims.

I claim:

1. A three-wheeled, dual-power, vehicle which comprises:

a frame;

a rider's seat secured to said frame;

three wheels mounted on said frame for carrying said vehicle across the ground, at least one wheel mounted forward of said seat and at least one wheel mounted aft of said seat;

a pedal assembly operable by a rider's feet and connected to at least one of said wheels to cause rotation of said one wheel;

said pedal assembly circularly rotatable about an axis about the same distance above the ground as said seat;

said pedal assembly further including a first sprocket circularly rotatable about said axis;

a hand power assembly comprising two hand levers operable by a rider's hand at a distal end of said hand levers, a lower end of each of said hand lever pivotally mounted to outer ends of a crosspiece of a yoke linking the said two said hand levers, said yoke pivotally mounted on said frame for parallel forward and rearward movement of said hand levers to cause said hand levers to move alternatively forward and rearward together, each said pivoted lower end of said two hand levers are further pivotally fastened at one end of two connecting rods which are pivotally fastened at the other end of each said connecting rod to a pivot member which is pivotally mounted on said yoke to pivot said hand levers to a left side or a right side for sideways parallel movement of said two hand levers with said distal ends of said two hand levers substantially equidistant from said ground when steering said vehicle to said left side or said right side;

said hand power assembly including a ratchet sprocket secured to said first sprocket for circular rotation with said first sprocket in one direction;

said hand power assembly connecting said hand levers and to at least one of said wheels for translating said rearward lever movement into wheel rotation;

a steering assembly connecting said hand levers and to at least one of said wheels for translating said sideways movement into rotation of said at least one wheel about a generally vertical axis to steer said vehicle; and a braking assembly including brake operating means mounted on at least one of said hand levers and wheel brake means mounted on at least one wheel.

2. The vehicle according to claim 1 wherein said three wheels include two wheels forward of said seat and one wheel aft of said seat.

3. The vehicle according to claim 1 wherein said pedal assembly includes at least one gear ratio changing means and drive means connected from said pedals through said gear ratio changing means to said at least one wheel aft of the seat.

4. A dual-power recumbent tricycle for traverse across the ground, which comprises:

a frame;

two spaced, approximately parallel forward wheels mounted on said frame;

one rear wheel mounted on said frame;

a seat secured to said frame between said forward and said rear wheels for supporting a rider in a generally recumbent position with legs extending forward;

a pedal assembly mounted forward of said seat for operation by a rider's feet, including drive means comprising a first sprocket mounted on an axis for connecting said pedal assembly and said wheels for rotating said wheels;

a hand power assembly comprising two hand levers each said hand lever having a first end and terminating at a distal end, said first end of each said hand lever pivotally mounted to outer ends of a yoke linking the two said hand levers together, said yoke pivotally mounted on said frame at a first pivot means for allowing said hand levers to be pivotally moved alternately forward and rearward together in parallel;

two connecting rods each having a first end pivotally connected to a second pivot means at the first end of each said hand lever and a second end of said connecting rods pivotally connected to a pivot member which is pivotally mounted on said yoke, wherein each said hand lever is pivotally connected to said connecting rods to said second pivot means at said first end of said hand levers to pivot said hand lever to a left side or a right side in parallel for allowing said hand levers to be pivoted alternately sideways together with both said distal ends of said hand levers substantially equidistant from said ground when steering said vehicle to said left side or said right side;

a hand power assembly comprising a ratchet sprocket mounted on said axis for rotating with said first sprocket when said hand levers are pivoted rearwardly for connecting said first pivot means to said drive means to further cause said wheels to rotate; and a steering assembly connected to said second pivot means for causing said two forward wheels to rotate about an approximately vertical axis to steer said tricycle.

5. The tricycle according to claim 4 further including brake operating means mounted on each of said levers, said brake operating means on one lever operatively connected to brake said two forward wheels and said brake operating means on the other hand lever operatively connected to brake said rear wheel.

6. The tricycle according to claim 5 wherein said brake operating means comprises caliper brakes on forward wheels and a disk brake on said rear wheel.

7. The tricycle according to claim 4 wherein said hand power assembly comprises a ratchet mechanism connected to said drive means and a drive chain extending between said hand power assembly, said ratchet mechanism and, through an extension spring, to said frame to engage said drive means and increase power on said drive means when moved in one direction and to disengage from said drive means when moved in a direction opposite said one direction.

8. The tricycle according to claim 4 wherein said steering assembly comprises a tie rod extending between said two forward wheels and at least one cable connecting said tie rod to said second pivot means so that sideways movement of said had levers moves said tie rod to steer said tricycle.

9. The tricycle according to claim 4 wherein said drive assembly comprises a first gear changing means adjacent to said pedals and a second gear changing means adjacent to said rear wheel, power transmission chains connecting, in order, from said pedals to said first gear changing means, to said second changing means to said rear wheel, and control means on said levers for operating said first and second gear changing means.

10. The tricycle according to claim 9 further including a chain tightening means engaging said power transmission chain between said first gear changing means and said second gear changing means.

11. The tricycle according to claim 4 wherein said rear wheel is mounted on a sub-frame pivotally secured to said frame for upward and downward pivoting and further including a shock absorber between said sub-frame and said frame.

* * * * *